(12) United States Patent
Morishita et al.

(10) Patent No.: US 11,396,249 B2
(45) Date of Patent: Jul. 26, 2022

(54) VENTILATION MAT

(71) Applicant: KURABE INDUSTRIAL CO., LTD., Hamamatsu (JP)

(72) Inventors: Norishige Morishita, Shizuoka (JP); Hiroya Takeda, Shizuoka (JP); Hirotaka Fujii, Shizuoka (JP)

(73) Assignee: KURABE INDUSTRIAL CO., LTD., Hamamatsu (JP)

( * ) Notice: Subject to any disclaimer, the term of this patent is extended or adjusted under 35 U.S.C. 154(b) by 231 days.

(21) Appl. No.: 16/618,059

(22) PCT Filed: May 25, 2018

(86) PCT No.: PCT/JP2018/020212
§ 371 (c)(1),
(2) Date: Nov. 27, 2019

(87) PCT Pub. No.: WO2018/221422
PCT Pub. Date: Dec. 6, 2018

(65) Prior Publication Data
US 2020/0108752 A1    Apr. 9, 2020

(30) Foreign Application Priority Data

May 31, 2017 (JP) ............................. JP2017-108423
Oct. 24, 2017 (JP) ............................. JP2017-204921
Dec. 22, 2017 (JP) ............................. JP2017-245949

(51) Int. Cl.
*A47C 7/74*    (2006.01)
*B60N 2/56*    (2006.01)

(52) U.S. Cl.
CPC ................................ *B60N 2/5642* (2013.01)

(58) Field of Classification Search
CPC ....... B60N 2/5621; B60N 2/56; B60N 2/5642
See application file for complete search history.

(56) References Cited

U.S. PATENT DOCUMENTS 3,370,520 A * 2/1968 Mauch ................. A47C 31/116
                                                454/370
4,002,108 A * 1/1977 Drori ........................ A47C 7/74
                                                454/120
(Continued)

FOREIGN PATENT DOCUMENTS

| JP | 4107033 B2 | 6/2008 |
| JP | 4125721 B2 | 7/2008 |
| WO | 2009016772 A1 | 2/2009 |

OTHER PUBLICATIONS

Japanese Patent Office, Office Action Issued in Application No. 2019-522200, dated May 17, 2022, 10 pages.

*Primary Examiner* — Shin H Kim
(74) *Attorney, Agent, or Firm* — McCoy Russell LLP

(57) ABSTRACT

A ventilation mat according to the present invention includes: a ventilation mat body; and an ventilation guide with a fan attachment hole provided at one end thereof, and the other end of the ventilation guide being connected to a connection hole provided on a side surface of the ventilation mat body, in which the ventilation mat body includes: a first base material having an air-permeable three-dimensional structure; an air-permeable cover configured to cover a surface of the first first base material; a side barrier configured to cover an outer periphery of the first base material other than the connection hole, the side barrier having an air permeability lower than that of the air-permeable cover; and an opening surface that is surrounded by the side barrier and exposes the first base material.

20 Claims, 14 Drawing Sheets

(56) References Cited

U.S. PATENT DOCUMENTS

| | | | | |
|---|---|---|---|---|
| 4,175,297 A * | 11/1979 | Robbins | A61G 7/05776 | 5/284 |
| 5,403,065 A * | 4/1995 | Callerio | A47C 7/74 | 297/180.11 |
| 5,601,332 A * | 2/1997 | Schultz | B60N 2/4235 | 297/216.13 |
| 5,921,858 A * | 7/1999 | Kawai | B60N 2/6054 | 454/120 |
| 5,927,817 A * | 7/1999 | Ekman | B60N 2/5635 | 297/452.47 |
| 6,045,151 A * | 4/2000 | Wu | B60R 21/207 | 280/728.3 |
| 6,109,688 A * | 8/2000 | Wurz | A47C 7/744 | 297/180.13 |
| 6,386,577 B1 * | 5/2002 | Kan | B60R 21/207 | 280/728.1 |
| 6,511,125 B1 * | 1/2003 | Gendron | A47C 7/742 | 297/180.11 |
| 6,626,488 B2 * | 9/2003 | Pfahler | A47C 7/744 | 297/180.11 |
| 6,629,724 B2 * | 10/2003 | Ekern | B60N 2/5635 | 297/180.11 |
| 6,893,086 B2 * | 5/2005 | Bajic | B60N 2/5657 | 297/180.14 |
| 6,969,827 B2 * | 11/2005 | Yoneyama | B60N 2/5685 | 219/202 |
| 7,070,231 B1 * | 7/2006 | Wong | B60N 2/6027 | 297/180.11 |
| 9,440,567 B2 * | 9/2016 | Lazanja | B60N 2/5621 | |
| 9,527,418 B2 * | 12/2016 | Sachs | B60N 2/995 | |
| 10,449,877 B1 * | 10/2019 | Tait | B60H 1/00564 | |
| 11,034,271 B2 * | 6/2021 | Miyano | A47C 21/044 | |
| 2002/0140258 A1 * | 10/2002 | Ekern | B60N 2/5635 | 297/180.14 |
| 2004/0036326 A1 | 2/2004 | Bajic et al. | | |
| 2004/0069762 A1 | 4/2004 | Yoneyama et al. | | |
| 2005/0121965 A1 * | 6/2005 | Stowe | B60N 2/5685 | 297/452.42 |
| 2009/0152909 A1 * | 6/2009 | Andersson | B60N 2/565 | 297/180.13 |
| 2010/0186357 A1 | 7/2010 | Takeda et al. | | |
| 2011/0260509 A1 * | 10/2011 | Siu | B60N 2/5635 | 297/180.14 |
| 2015/0069811 A1 * | 3/2015 | Sachs | B60N 2/995 | 297/423.1 |
| 2016/0137110 A1 * | 5/2016 | Lofy | B60N 2/565 | 62/3.3 |
| 2018/0370401 A1 * | 12/2018 | Miller | A47C 7/744 | |
| 2019/0232835 A1 * | 8/2019 | Murakami | B60N 2/565 | |
| 2019/0241101 A1 * | 8/2019 | Line | B60N 2/5685 | |
| 2019/0298072 A1 * | 10/2019 | Bhatia | A47C 27/125 | |
| 2020/0207243 A1 * | 7/2020 | Rogers | B60N 2/5657 | |
| 2020/0269736 A1 * | 8/2020 | Sieting | B60N 2/5642 | |
| 2020/0282882 A1 * | 9/2020 | Kawashima | B60N 2/5685 | |
| 2020/0361350 A1 * | 11/2020 | Hoshi | B60N 2/5657 | |
| 2021/0039791 A1 * | 2/2021 | Wilson | B60N 2/5657 | |
| 2021/0122272 A1 * | 4/2021 | Miyano | B60N 2/5685 | |
| 2021/0268944 A1 * | 9/2021 | Hoshi | B60N 2/56 | |

* cited by examiner

TOP VIEW

BOTTOM VIEW

FIRST EXAMPLE

SECOND EXAMPLE

VENTILATION MAT

CROSS-REFERENCE TO RELATED APPLICATIONS

The present application is a U.S. National Phase of International Patent Application Serial No. PCT/JP2018/020212 entitled "VENTILATION MAT," filed on May 25, 2018. International Patent Application Serial No. PCT/JP2018/020212 claims priority to Japanese Patent Application No. 2017-108423 filed on May 31, 2017 and Japanese Patent Application No. 2017-204921 filed on Oct. 24, 2017 and Japanese Patent Application No. 2017-245949 filed on Dec. 22, 2017. The entire contents of each of the above-referenced applications are hereby incorporated by reference for all purposes.

TECHNICAL FIELD

The present invention relates to a ventilation mat, and in particular, to a ventilation mat that is integrated into a seat of an automobile and performs ventilation on a seat surface and a backrest.

BACKGROUND ART

In recent years, as one method for improving comfort of the interior space of an automobile, a ventilation system for ventilating a seat surface and a backrest of an automobile seat has been incorporated into the automobile. Patent Literature 1 discloses an example of this ventilation system.

The insert for a vehicle seat disclosed in Patent Literature 1 is a vehicle ventilation seat including a seat cushion, an air-permeable seat cover, and an insert located beneath the seat cover, in which the insert includes a first layer and a second layer each having a barrier sublayer, the barrier sublayer of the first layer including: a first layer and a second layer that are adhesively secured to the barrier sublayer of the second layer to seal around the periphery of the insert and form a laterally extending peripheral strip; a spacer material forming a hollow part within the insert; and at least one of a first opening and a second opening, and further includes a ventilating apparatus in fluid communication with the first and the second openings, and the hollow part of the spacer material.

CITATION LIST

Patent Literature

Patent Literature 1: Japanese Patent No. 4125721
Patent Literature 2: Japanese Patent No. 4107033

SUMMARY OF INVENTION

Technical Problem

However, the insert for the vehicle seat disclosed in Patent Literature 1 has a structure in which the spacer material is wrapped by the barrier sublayer of the first layer and the barrier sublayer of the second layer, the peripheral parts of which are adhesively secured. This structure causes a problem that slippage of the spacer material occurs in a space formed by the barrier sublayer of the first layer and the barrier sublayer of the second layer, thereby impairing comfort of a seat including a seating comfort thereof.

Solution to Problem

One aspect of a ventilation mat according to the present invention is a ventilation mat including: a ventilation mat body; and a ventilation guide with a fan attachment hole provided at one end thereof, the other end of the ventilation guide being connected to a connection hole provided on a side surface of the ventilation mat body, in which the ventilation mat body includes: a first base material having an air-permeable three-dimensional structure; an air-permeable cover that is formed of a cloth, is entirely air-permeable, and covers a surface of the first base material; a side barrier that has an air permeability lower than that of the air-permeable cover, and covers an outer periphery of the first base material other than the connection hole; and an opening surface that is surrounded by the side barrier and exposes the first base material, and the ventilation guide is a non-air-permeable tube, and includes a ventilation path formed inside thereof by a second base material having an air-permeable three-dimensional structure.

Advantageous Effects of Invention

The ventilation mat according to the present invention makes it possible to improve comfort including a seating comfort of a seat.

DESCRIPTION OF EMBODIMENTS

First Embodiment

Hereinafter, embodiments according the present invention will be described with reference to the drawings. A ventilation mat described below is provided on at least one of a seat surface of an automobile seat and a backrest thereof. Further, the ventilation mat according to the present invention is installed so as to be sandwiched between a cushioning material of the automobile seat and a skin cover covering the cushioning material. Further, a fan is provided in the ventilation mat, and this fan sucks air from the ventilation mat or allows air to flow into the ventilation mat.

In the following description, in a state in which the ventilation mat is installed in the automobile seat, the surface located on the skin cover side, that is, the seat surface side is referred to as a front surface, and the surface located on the cushioning material side of the automobile seat is referred to as a rear surface.

Figure 1:
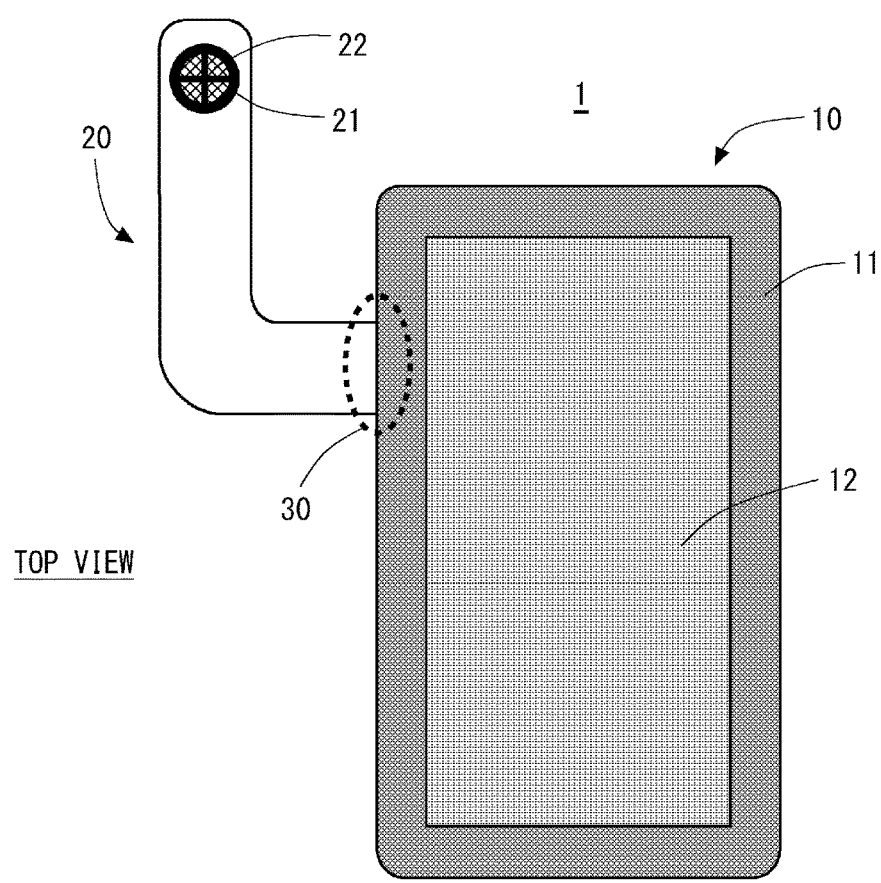
FIG. 1 is a schematic diagram of a ventilation mat according to a first embodiment.
Figure 1:
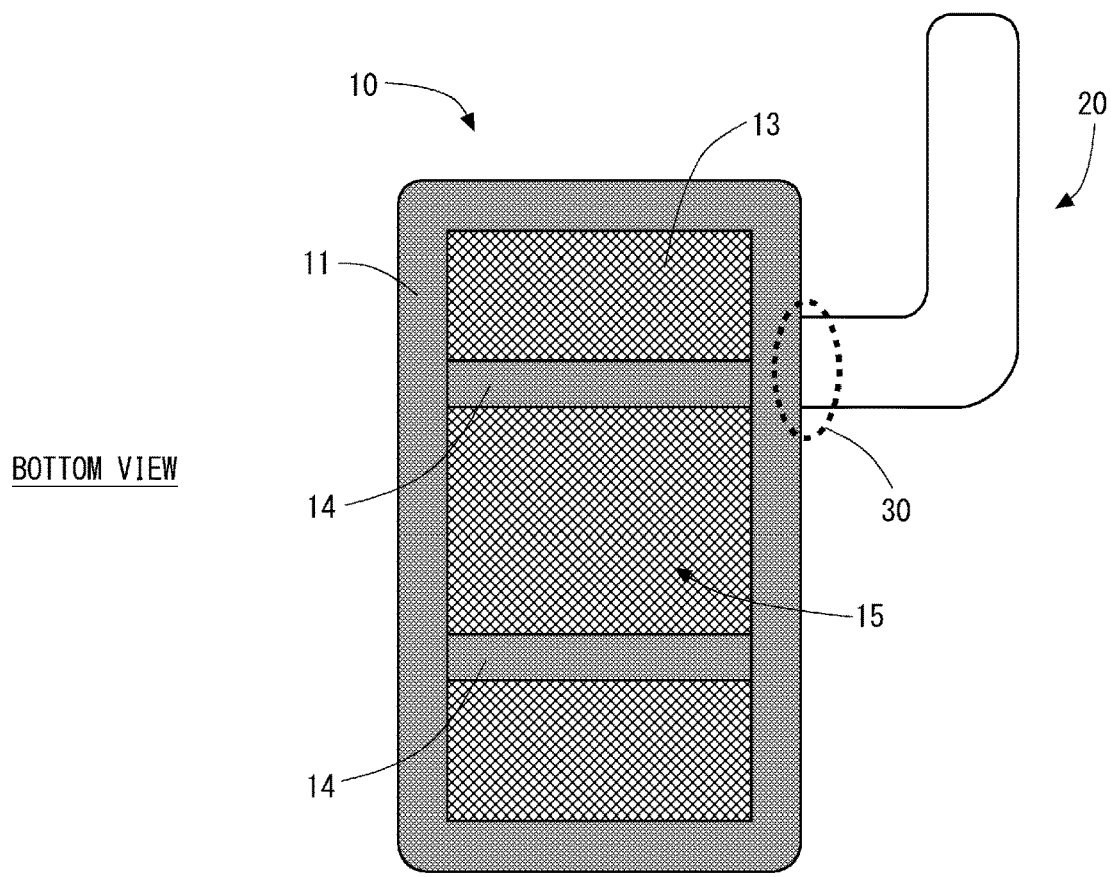

FIG. 1 shows a schematic diagram of a ventilation mat 1 according to a first embodiment. In FIG. 1, a top view and a bottom view of the ventilation mat 1 are shown. The top view shows a structure of the front surface side of the ventilation mat 1 according to the first embodiment, and the bottom view shows a structure of the rear surface side of the ventilation mat 1 according to the first embodiment.

As shown in FIG. 1, the ventilation mat 1 according to the first embodiment includes a ventilation mat body 10 and a ventilation guide 20. Further, the ventilation mat 1 is formed by providing a fan attachment hole at one end of the ventilation guide 20 and connecting a connection hole provided on a side surface of the ventilation mat body 10 to the other end of the ventilation guide 20.

The ventilation mat body 10 includes a first base material (e.g., a spacer 13), a side barrier 11, an air-permeable cover 12, connecting belts 14, and an opening surface 15. The spacer 13 is a sheet having an air-permeable three-dimensional structure. The spacer 13 is, for example, a 3D mesh sheet in which fibers are three-dimensionally knitted. When this 3D mesh sheet is cut into a predetermined shape, laser fusion cutting is preferably used for the processing. By doing so, generation of fiber waste due to fraying of the end surface can be prevented.

The side barrier 11 has an air permeability lower than that of the air-permeable cover 12, and covers the outer periphery of the spacer 13 other than the connection hole to which the ventilation guide 20 is connected. The side barrier 11 covers the outer periphery of the spacer 13, for example, by being adhered by an adhesive or a pressure sensitive adhesive, or by being sewn or welded to the spacer 13.

The air-permeable cover 12 is formed of a cloth, is entirely air-permeable, and covers the front surface of the spacer 13. Note that the area of the air-permeable cover 12 covering the spacer 13 is the region of the front surface of the spacer 13 which is not covered with the side barrier 11.

It is preferred that the air-permeable cover 12 be a fiber material such as a nonwoven fabric and have a high air permeability. On the other hand, a material having an air permeability lower than that of the air-permeable cover 12 is selected for the side barrier 11. As the side barrier 11, for example, a nonwoven fabric, a spunbonded nonwoven fabric, a woven fabric, a film, and a rubberized cloth can be used. Note that examples of materials of a nonwoven fabric, a spunbonded nonwoven fabric, and a woven fabric include aramid fiber, glass fiber, cellulose fiber, nylon fiber, vinylon fiber, polyester fiber, polyethylene fiber, polypropylene, polyolefin fiber, and rayon fiber. Further, examples of the material of a film include polyethylene, polyvinyl, a polypropylene, and a PET. The processing for providing airtightness to fibers has been performed on the rubberized cloth.

Further, the air-permeable cover 12 is not provided on the rear surface of the ventilation mat body 10, and a part surrounded by the side barrier 11 is the opening surface 15. That is, the spacer 13 is exposed at the opening surface 15. Further, the connecting belts 14, which connect both sides of the side barrier 11 to each other across the opening surface 15, are provided on the rear surface of the ventilation mat body 10. These connecting belts 14 makes the shape of the ventilation mat body 10 stable.

The ventilation guide 20 is a non-air-permeable tube, and includes a ventilation path formed inside thereof by a second base material (e.g., a spacer 22) having an air-permeable three-dimensional structure. The same material as the first base material, for example, a 3D mesh sheet in which fibers are three-dimensionally knitted can be used for this spacer 22.

An opening is provided at one end of the ventilation guide 20 so that the spacer 22 is exposed. A mold made of a plastic material is fitted into this opening, whereby a fan attachment hole 21 is formed. The other end of the ventilation guide 20 is inserted into the connection hole provided in the side barrier 11. In FIG. 1, the part in which the ventilation guide 20 and the ventilation mat body 10 are connected to each other is a connection part 30.

Figure 2:
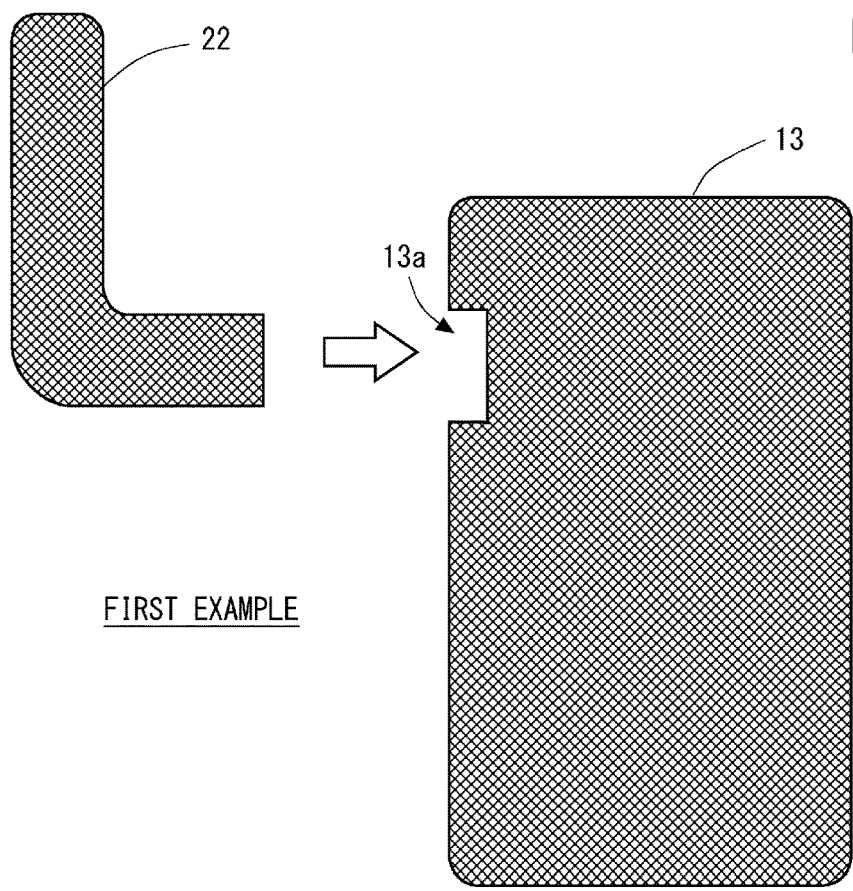
FIG. 2 is a diagram for explaining a shape of a base material of the ventilation mat according to the first embodiment.
Figure 2:
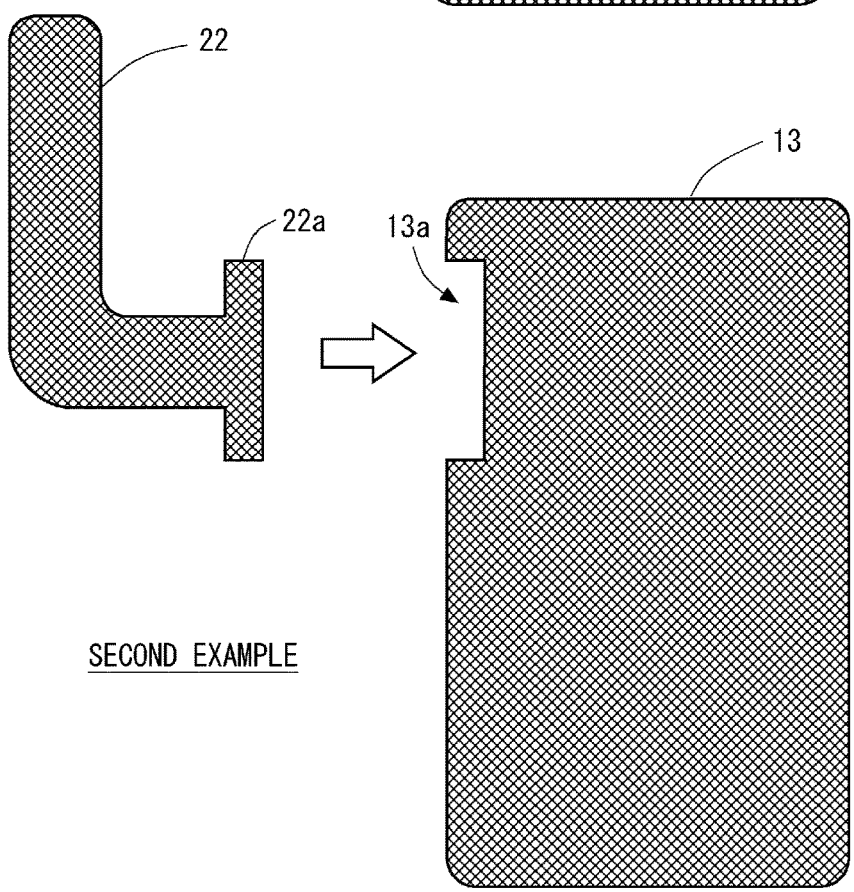

Here, a shape of the spacer 13 is more specifically described. FIG. 2 is a diagram for explaining the shape of a base material (e.g., a spacer) of the ventilation mat according to the first embodiment. In FIG. 2, a first example and a second example are shown for the shapes of the spacers 13 and 22. As shown in FIG. 2, the spacers 22 and 13 are formed as components different from each other. In the first example, a notched part 13a is provided in the ventilation mat body 10. Meanwhile, although the width of the shape of the spacer 22 to be inserted into the ventilation mat body 10 is the same as that of the part to be covered with a non-air-permeable tube having a bag-like shape, a part to be inserted into the notched part 13a while being covered with the non-air-permeable tube is exposed. The notched part 13a of the ventilation mat body 10 serves as the connection part for connecting the ventilation guide 20 to the ventilation mat body 10. By forming the spacer 22 with such a shape as described above, it is possible to improve the member utilization efficiency when the spacer 22 is cut out from the original 3D mesh sheet material.

In the second example, a detachment preventing part 22a, which projects from the ventilation guide 20 and has a width larger than that of the ventilation guide 20, is formed at the end of the spacer 22 on the connection hole side. Further, the notched part 13a having a shape corresponding to the shape of the detachment preventing part 22a is provided in the vicinity of the connection hole of the spacer 13. When the ventilation mat 1 is assembled, the side barrier 11 is provided on the outer periphery of the spacer 13 in a state in which the detachment preventing part 22a has been fitted into the notched part 13a. Consequently, the detachment preventing part 22a is pressed by the side barrier 11, and the ventilation guide 20 is prevented from falling off the ventilation mat body 10. Thus, the ventilation guide 20 and the ventilation mat body 10 form an integral component. The method for connecting the ventilation guide 20 to the ventilation mat body 10 is not limited to a particular method, and any conventionally known methods such as adhesion, pressure sensitive adhesion, sewing, and welding can be employed.

Figure 3:
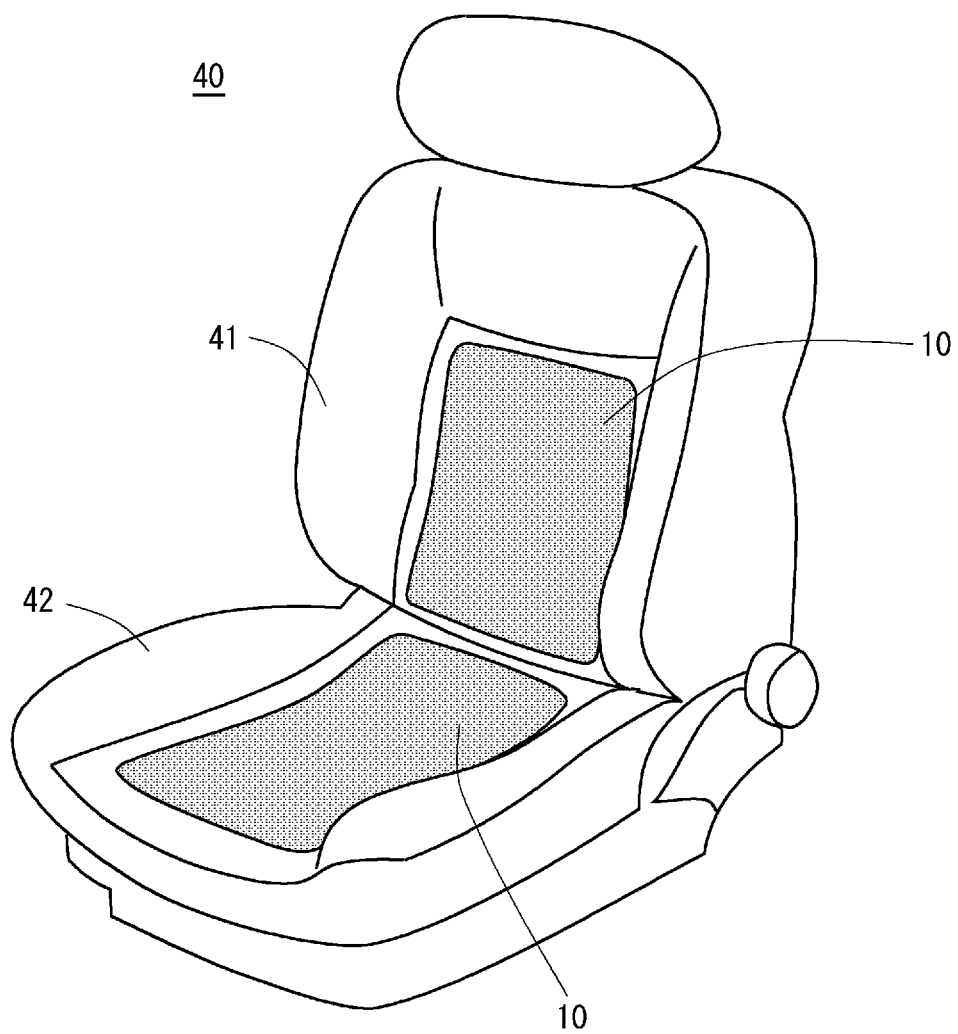
FIG. 3 is a schematic diagram of an automobile seat on which the ventilation mat according to the first embodiment is mounted.

Next, a configuration in which the ventilation mat 1 according to the first embodiment is integrated into an automobile seat is described. FIG. 3 is a schematic diagram of the automobile seat on which the ventilation mat according to the first embodiment is mounted. The ventilation mat 1 according to the first embodiment is mounted in an automobile seat 40 in a state in which it is hidden by the skin cover since it is actually installed under the skin cover. Therefore, in the schematic diagram shown in FIG. 3, the part in which the ventilation mat 1 is installed in the automobile seat 40 is indicated by a shaded pattern.

In the example shown in FIG. 3, the ventilation mats 1 are provided on a backrest 41 and a seat surface 42, respectively. As shown in FIG. 3, the ventilation mat body 10 of the ventilation mat 1 is installed in the backrest 41 or the seat surface 42. Meanwhile, the ventilation guide 20 is routed through or around the automobile seat 40 to the rear surface side thereof so that the fan attachment hole 21 is positioned on the rear surface side thereof.

As described above, the ventilation mat 1 according to the first embodiment covers the spacer 13 with the air-permeable cover 12 and the side barrier 11, and provides the opening surface 15 so that the spacer 13 is exposed at the rear surface facing the cushioning material. Further, a cloth such as a nonwoven fabric is used as the air-permeable cover 12.

The aforementioned structure enables the ventilation mat 1 according to the first embodiment to prevent the spacer 13 from being covered with the film, and to bring the spacer 13 into direct contact with the cushioning material with a large frictional force, and thus a friction noise of the film is eliminated. Accordingly, the inside of a vehicle can be made quieter. Further, in the ventilation mat 1 according to the first embodiment, the spacer 13 is prevented from being covered with the film, and is brought into direct contact with the cushioning material with a large frictional force, and thus slippage of the ventilation mat 1 due to the material of the film is eliminated. Accordingly, the seating comfort can be improved.

Further, in the ventilation mat 1 according to the first embodiment, the outer periphery of the spacer 13 is covered with the side barrier 11, and thus the spacer 13 is unlikely to lose its shape. Accordingly, the dimensional accuracy of the ventilation mat 1 can be improved.

Further, in the ventilation mat 1 according to the first embodiment, the components constituting the ventilation mat 1 are reduced in weight by covering the spacer 13 with a material such as a nonwoven fabric and causing the spacer 13 to be exposed on the rear surface side of the ventilation mat 1. Thus, the components can be reduced in weight without impairing the ventilation function.

Further, the ventilation mat 1 according to the first embodiment is formed by a combination of components having simple shapes, and thus the material utilization efficiency of the components of the ventilation mat 1 is high (e.g., the ratio of an available material in one material with respect to a waste material is high). That is, the ventilation mat 1 according to the first embodiment can reduce manufacturing cost by an improved efficiency of utilization of materials.

Second Embodiment

In a second embodiment, an example in which a mask sheet is attached to the air-permeable cover 12 is described. FIGS. 4 to 7 show first to fourth examples of the ventilation mat according to the second embodiment. FIGS. 4 to 7 are all top views of the ventilation mat. Note that in the description of the second embodiment, the components described in the first embodiment are denoted by the same reference symbols as those in the first embodiment, and the description thereof will be omitted.

A material having an air permeability lower than that of the air-permeable cover 12 is used for a mask sheet 50 used in the second embodiment. The method for attaching the mask sheet 50 to the air-permeable cover 12 may be, for example, adhesion, pressure sensitive adhesion, sewing, and welding.

Figure 4:
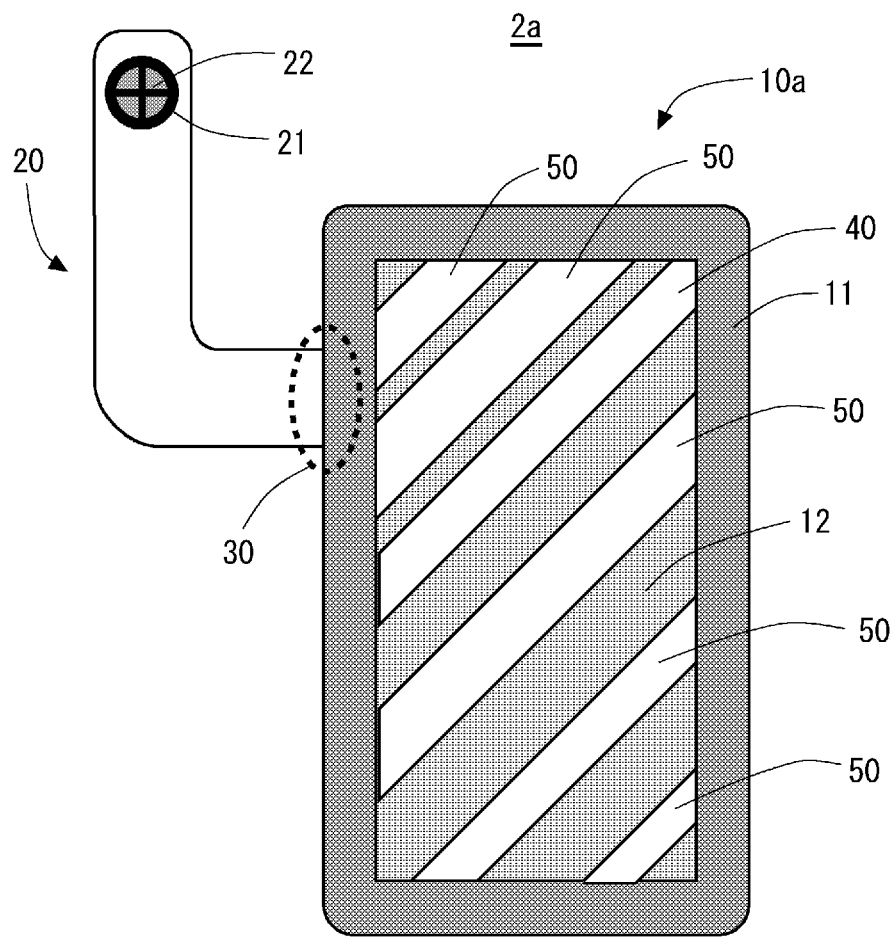
FIG. 4 is a top view of a first example of the ventilation mat according to a second embodiment.
Figure 5:
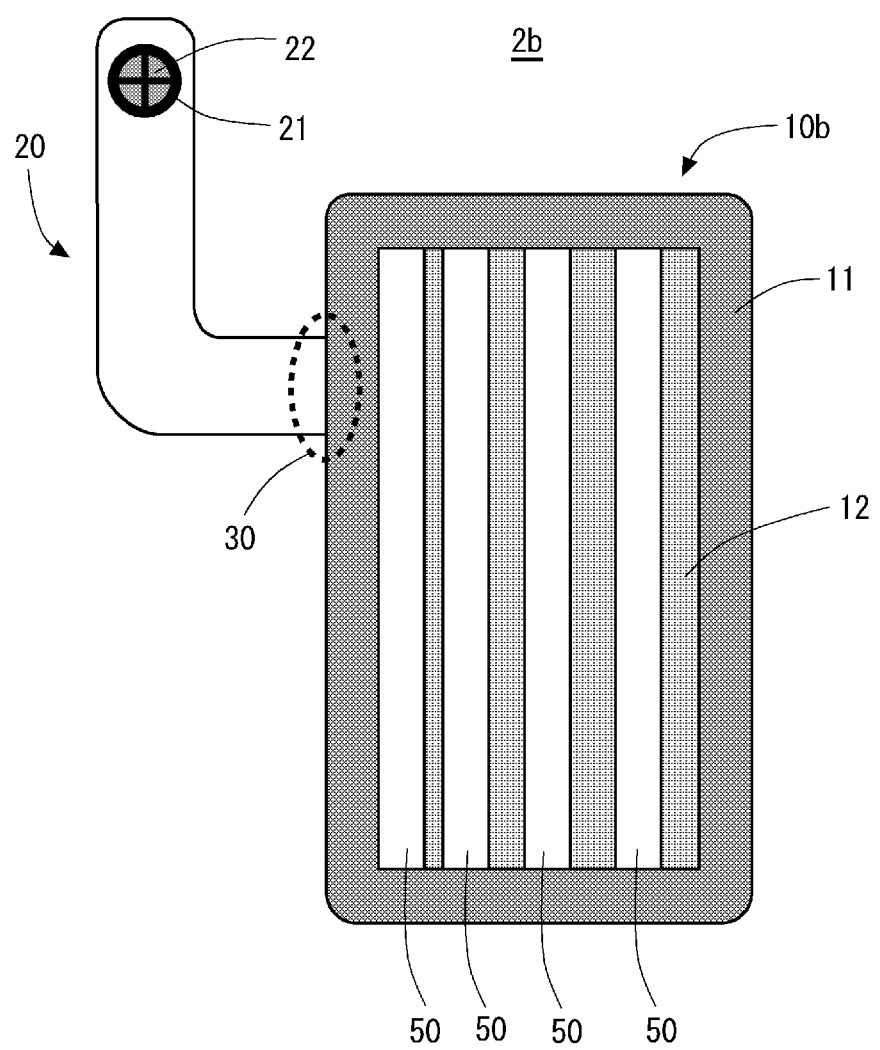
FIG. 5 is a top view of a second example of the ventilation mat according to the second embodiment.
Figure 6:
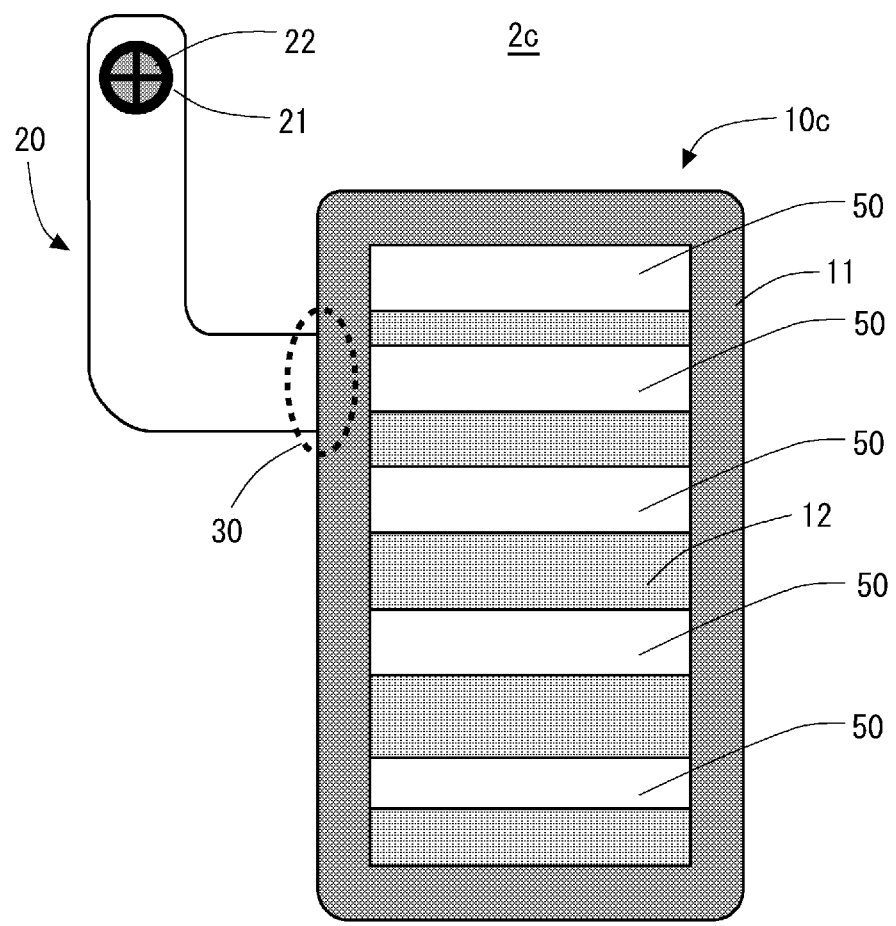
FIG. 6 is a top view of a third example of the ventilation mat according to the second embodiment.
Figure 7:
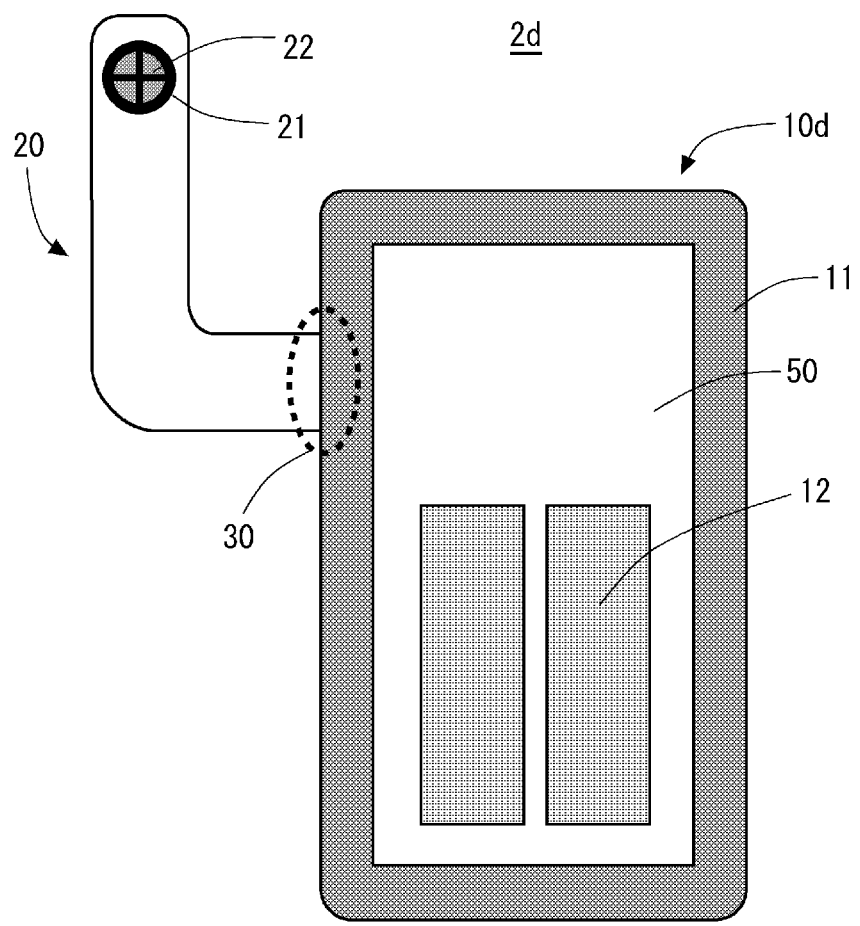
FIG. 7 is a top view of a fourth example of the ventilation mat according to second embodiment.

In the first example shown in FIG. 4, a plurality of mask sheets 50 are attached to the air-permeable cover 12 so as to extend in a direction oblique to the longitudinal direction of the air-permeable cover 12. In the second example shown in FIG. 5, a plurality of mask sheets 50 are attached to the air-permeable cover 12 so as to extend in a direction parallel to the longitudinal direction of the air-permeable cover 12. In the third example shown in FIG. 6, a plurality of mask sheets 50 are attached to the air-permeable cover 12 so as to extend in a direction orthogonal to the longitudinal direction of the air-permeable cover 12. In the fourth example shown in FIG. 7, the mask sheet 50 with an opening provided therein so that a part of the air-permeable cover 12 is exposed is attached thereto.

In all of the first to fourth examples shown in FIGS. 4 to 7, the mask sheet 50 is attached to the air-permeable cover 12 so that the exposed area per unit area of the air-permeable cover 12 is longer as the distance from the connection part 30 having the connection hole, in which the ventilation guide 20 is connected to the ventilation mat body 10, increases.

As described above, the mask sheet 50 enables ventilation capacity at a position distant from the connection part 30 to be improved by increasing the exposed area per unit area of the air-permeable cover 12 as the distance from the connection part 30 is longer. Further, by using the above-described mask sheet 50, a uniform ventilation capacity can be achieved within the surface of the ventilation mat 1.

Third Embodiment

In a third embodiment, a ventilation mat 3 which is another form of the ventilation mat 1 according to the first embodiment is described. Note that in the description of the third embodiment, the components described in the first embodiment are denoted by the same reference symbols as those in the first embodiment, and the description thereof will be omitted.

Figure 8:
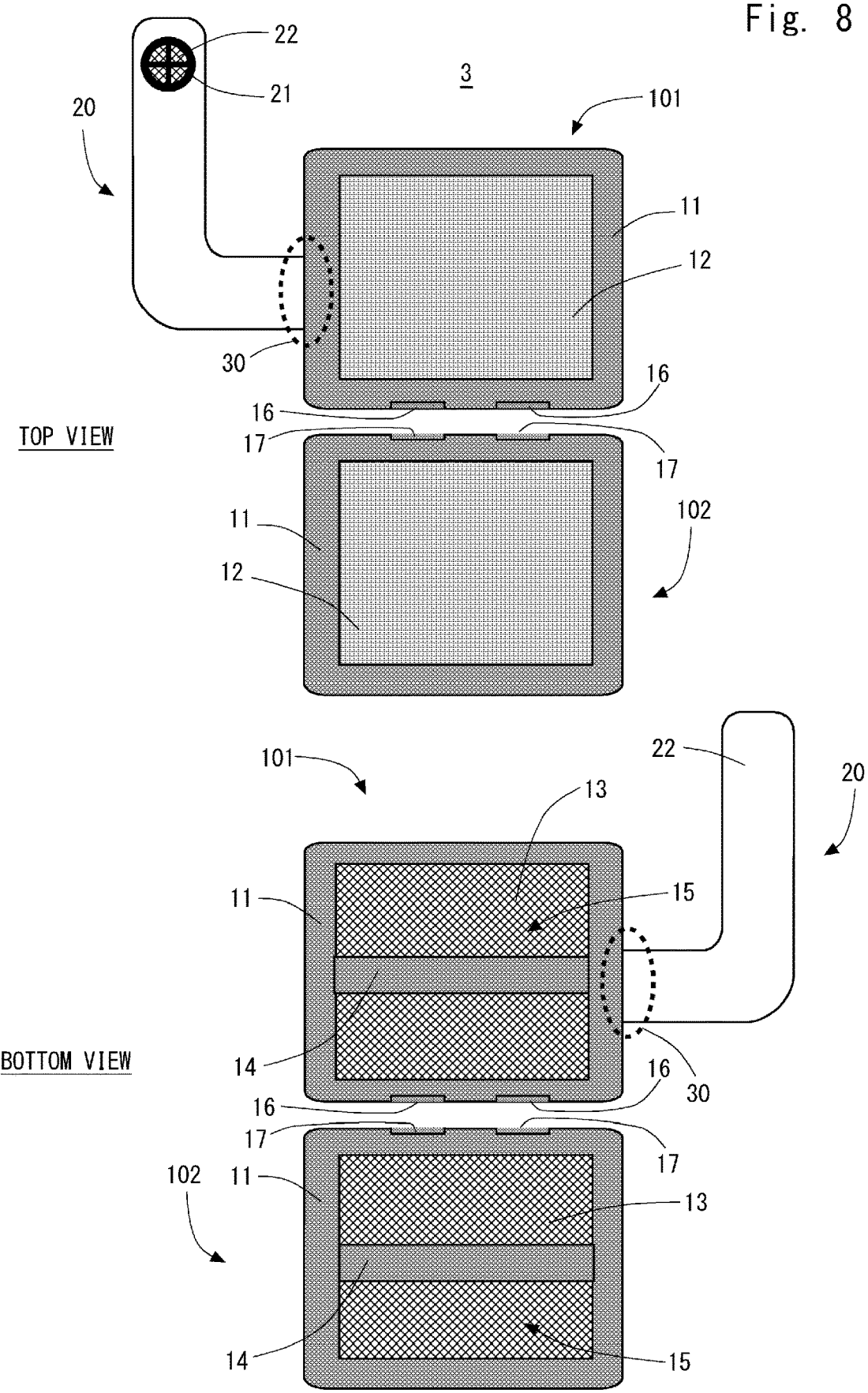
FIG. 8 is a schematic diagram of the ventilation mat according to a third embodiment.

FIG. 8 shows a schematic diagram of the ventilation mat 3 according to the third embodiment. As shown in FIG. 8, in the ventilation mat 3 according to the third embodiment, the ventilation mat body 10 is provided in a state in which it is divided into a first ventilation mat body 101 and a second ventilation mat body 102.

The basic structure of the first ventilation mat body 101 is the same as that of the ventilation mat body 10, except that the side barrier 11 is provided with first ventilation holes (e.g., ventilation holes 16). The basic structure of the second ventilation mat body 102 is the same as that of the ventilation mat body 10, except that the connection part 30 of the ventilation mat body 10 is not provided, and second ventilation holes (e.g., ventilation holes 17) corresponding to the ventilation holes 16 are provided in the side barrier 11. The ventilation holes 16 and 17 are provided at positions facing the ventilation holes 16 in an installed state of the ventilation mat 3.

Figure 9:
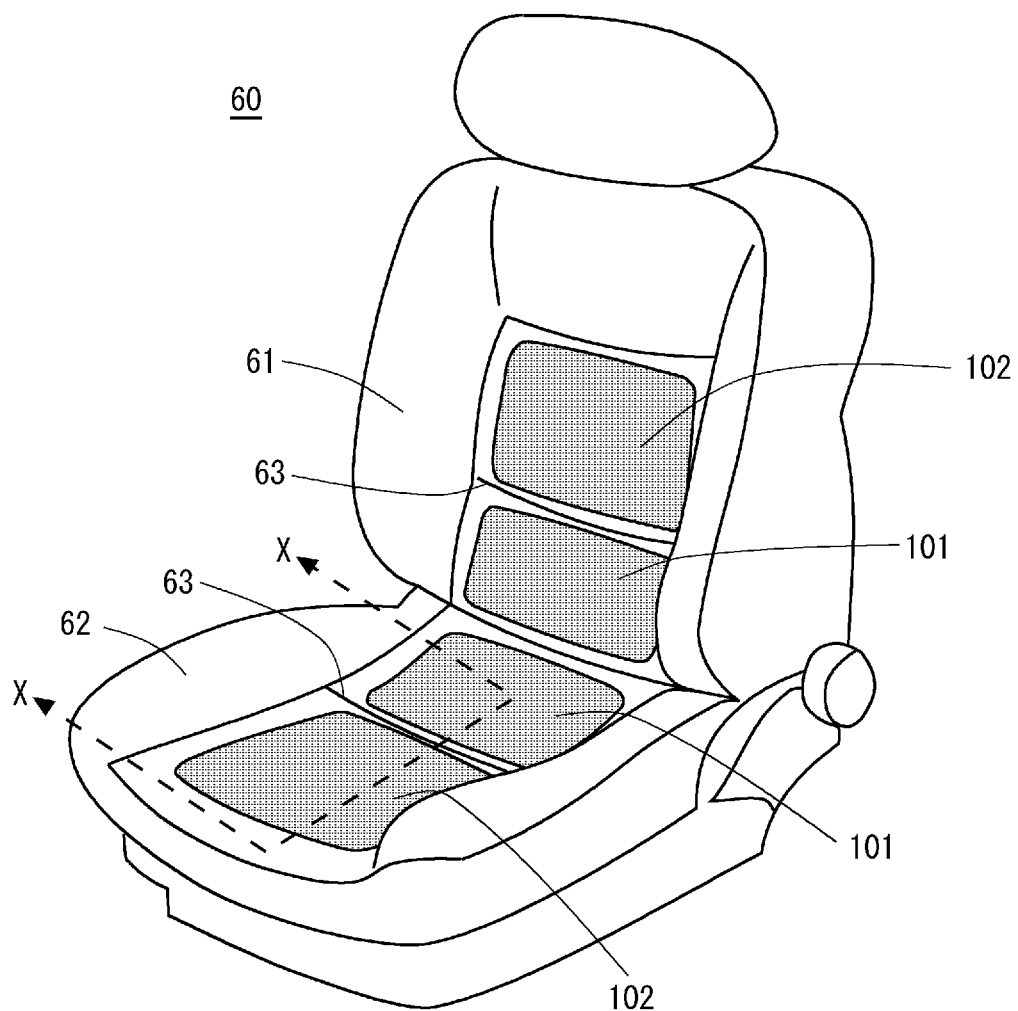
FIG. 9 is a schematic diagram of the automobile seat on which the ventilation mat according to the third embodiment is mounted.

Next, a form of integrating the ventilation mat 3 according to the third embodiment into an automobile seat is described. FIG. 9 is a schematic diagram of the automobile seat on which the ventilation mat 3 according to the third embodiment is mounted. The ventilation mat 3 according to the third embodiment is mounted on an automobile seat 60 in a state in which it is hidden by the skin cover since it is actually installed under the skin cover. Therefore, in the schematic diagram shown in FIG. 9, the part in which the ventilation mat 3 is installed in the automobile seat 60 is indicated by a shaded pattern.

As shown in FIG. 9, the automobile seat 60 includes a backrest 61 and a seat surface 62. Further, pulling-in parts 63 are provided in the backrest 61 and the seat surface 62, respectively. The pulling-in part 63 is a part in which the skin cover is coupled to the cushioning material by a pulling-in member. In the ventilation mat 3 according to the third embodiment, the first and the second ventilation mat bodies 101 and 102 are used as a pair of sheets, and the first ventilation mat body 101 and the second ventilation mat body 102 are arranged so as to sandwich the pulling-in part 63. Further, the sheets of each pair of the ventilation mats 3 according to the third embodiment is provided on the backrest 41 and the seat surface 42, respectively.

Figure 10:
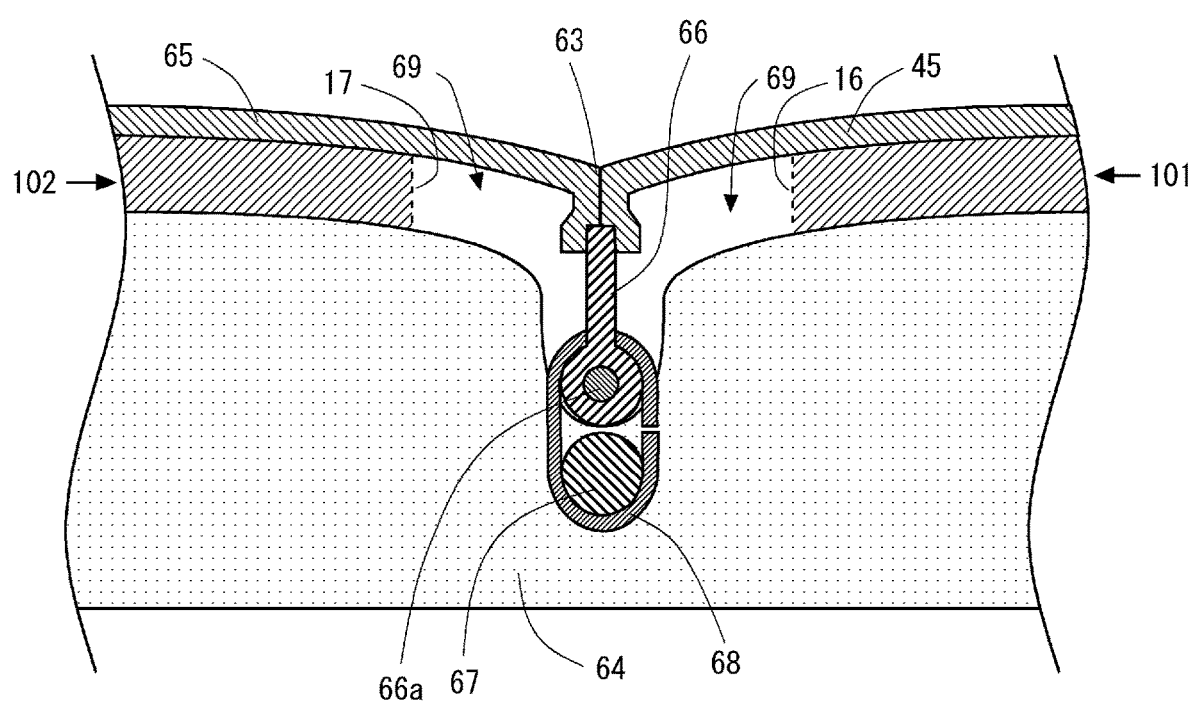
FIG. 10 is a cross-sectional view of a pulling-in part of the automobile seat on which the ventilation mat according to the third embodiment is mounted.

The structure in the vicinity of the aforementioned pulling-in part 63 is more specifically described. FIG. 10 shows a cross-sectional view of the pulling-in part of the automobile seat on which the ventilation mat according to the third embodiment is mounted, which view is taken along the line X-X of FIG. 9.

As shown in FIG. 10, the first and the second ventilation mat bodies 101 and 102 are provided at positions sandwiched between the cushioning material 64 and a skin cover 65. Further, the first ventilation and the second ventilation mat bodies 101 and 102 are arranged distant from each other so as to sandwich the pulling-in part 63. A pulling-in member 66 is provided in the pulling-in part 63, and the skin cover 65 is coupled to the cushioning material 64 so that the cushioning material 64 pulls the skin cover 65 by means of this pulling-in member 66. Specifically, a groove corresponding to the place where the pulling-in member 66 is attached to the skin cover 65 described above is formed in the cushioning material 64. Further, a metal wire is embedded as a fixing member 67 at the bottom of the groove. The above-described cushioning material 64 and skin cover 65 are coupled to each other by pulling the pulling-in member 66 of the skin cover 65 into the bottom of the groove of the cushioning material 64 and then fixing the pulling-in member 66 and the fixing member 67 by a stopper 68 such as a hook ring. The skin cover 65 is brought into a tensioned state due to the tension generated by pulling this pulling-in member 66 into the bottom of the groove of the cushioning material 64.

Further, air holes for providing ventilation between the ventilation holes 16 of the first ventilation mat body 101 and the ventilation holes 17 of the second ventilation mat body 102 are provided in the pulling-in member 66. Then, the air holes provide ventilation between the first and the second ventilation mat bodies 101 and 102.

In this case, the distance between the pulling-in member 66 and the ventilation holes 16 of the first ventilation mat body 101 and the distance between the pulling-in members 66 and the ventilation holes 17 of the second ventilation mat body 102 are preferably set within a predetermined range. If these distances are too short, the ventilation holes 16 and 17 may be closed by the pulling-in members 66 and the cushioning material 64 when the positions of the ventilation holes 16 and 17 shift due to a pressure at the time someone sits on the seat, and thus ventilation may not be performed. Further, if these distances are too long, the skin cover 65 and the cushioning material 64 may come into contact with each other due to a pressure at the time someone sits on the seat, and thus ventilation may not be performed. When it is assumed that the distance between the pulling-in member 66 and the ventilation hole 16 of the first ventilation mat body 101 is D1, the thickness of the first ventilation mat body 101 is T1, the distance between the pulling-in member 66 and the ventilation hole 17 of the second ventilation mat body 102 is D2, and the thickness of the second ventilation mat body 102 is T2, it is preferred that the D1 be 0.2 to 2 times T1 and the D2 be 0.2 to 2 times T2.

Figure 11:
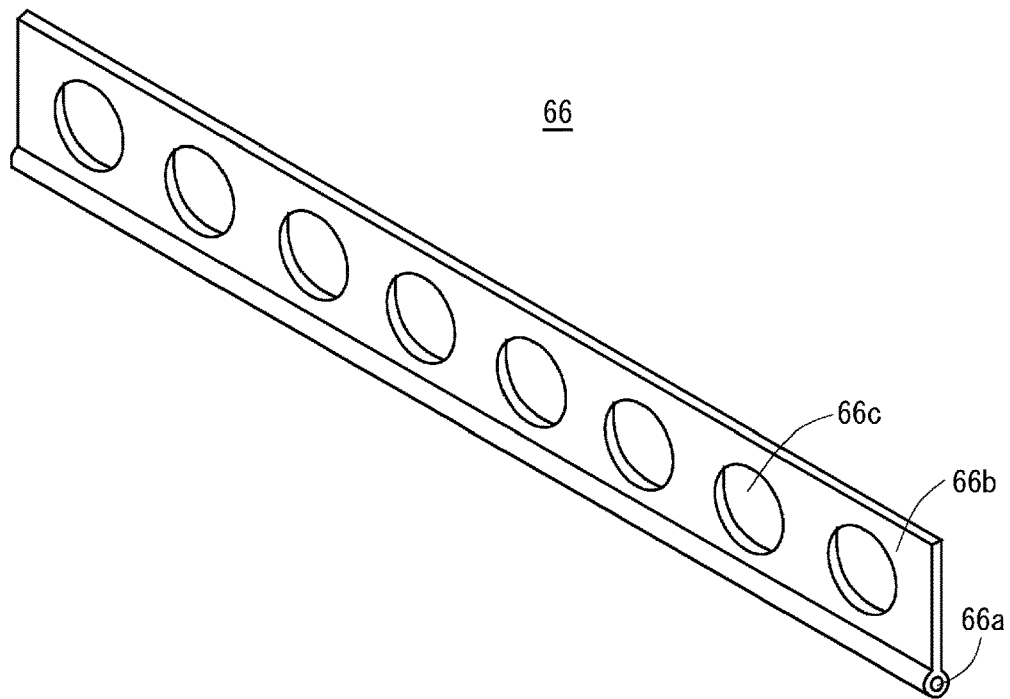
FIG. 11 is a diagram showing a structure of a pulling-in member according to the third embodiment.

Here, the pulling-in member 66 is more specifically described. FIG. 11 shows a diagram showing a structure of the pulling-in member according to the third embodiment. As shown in FIG. 11, the pulling-in member 66 includes a core 56a and a belt-like body 66b. The belt-like body 66b is made of a nonwoven fabric of a polyester fiber. Further, a plurality of air holes 66c each having a diameter of 20 mm are formed at intervals of, for example, 10 mm in the belt-like body 66b. In the example shown in FIG. 11, although the shape of the air hole 66c is circular, it can be various shapes such as an ellipse, a square, and a rectangle. This belt-like body 66b has a structure in which one end of the long side thereof is sewn to the skin cover 65, and the core 66a made of a metal wire is wound around the other end of the long side of the belt-like body 66b and fixed thereto.

Figure 12:
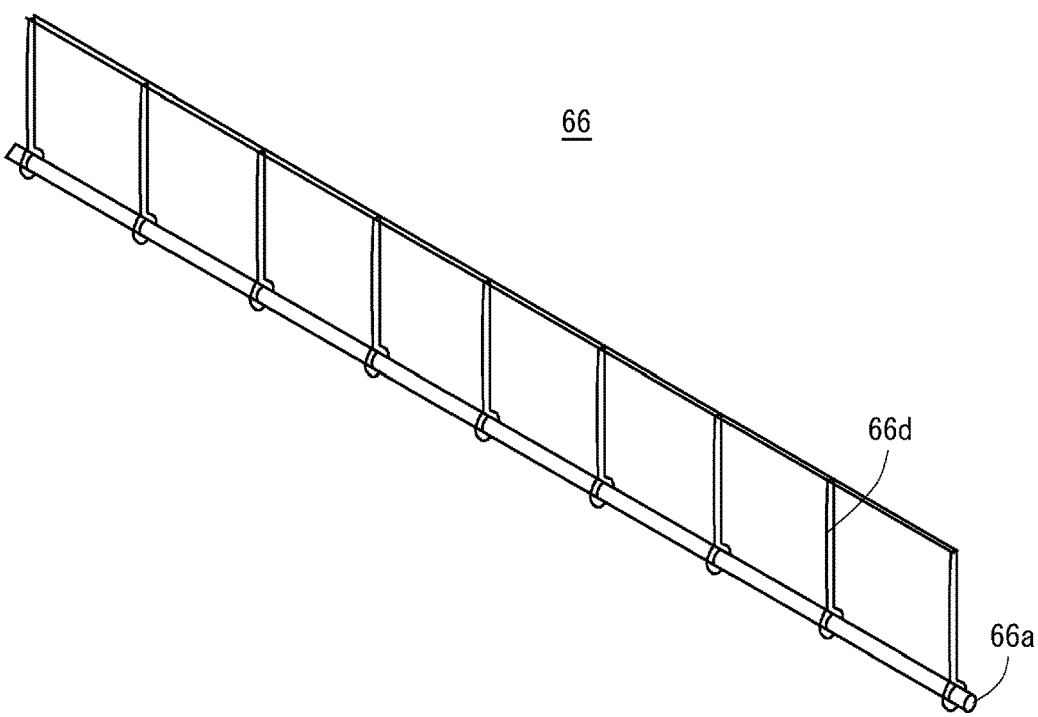
FIG. 12 is a diagram showing a structure of a different example of the pulling-in member according to the third embodiment.

Note that in the example shown in FIG. 11, although the belt-like body 66b made of a polyester nonwoven fabric is used, various materials such as a nonwoven fabric made of various materials, a woven fabric, a plastic sheet, a rubber sheet, and a hybrid material of these materials may be used. For example, a material sandwiching a sufficiently coarse mesh-like woven fabric between sufficiently coarse nonwoven fabrics may be used. Further, an air-permeable material such as a high porosity material may be used as the belt-like body 66b itself instead of forming the air hole 66c. Further, a plurality of linear bodies 66d as shown in FIG. 12 can be used instead of the belt-like body 66b, and a material in which these linear bodies 66d are arranged at predetermined intervals can be used.

Figure 13:
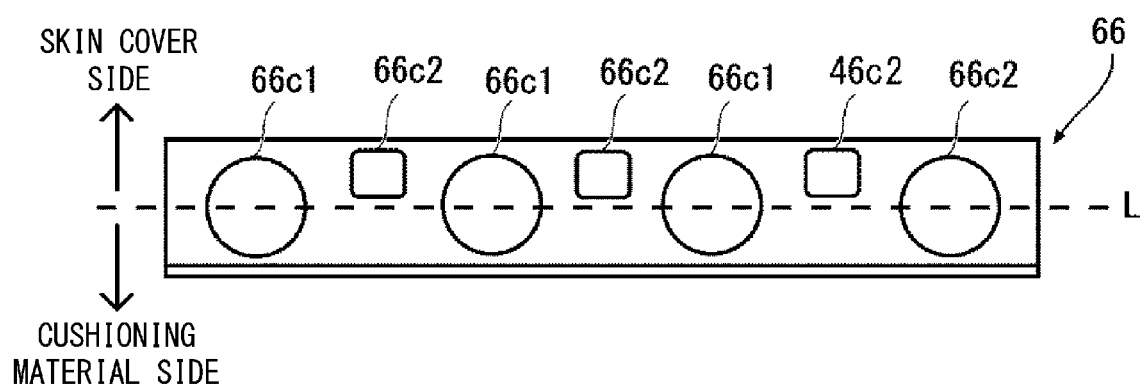
FIG. 13 is a diagram showing a structure of a different example of the pulling-in member according to the third embodiment.

Further, when the pulling-in member 66 in which the air holes 66c are formed in the belt-like body 66b as shown in FIG. 11 is used, the position, the size, the shape, and the like of the air hole 66c can be variously designed. However, in the case where the air holes 66c are formed in the vicinity of the core 66a, the air holes 66c may be buried in the bottom of the groove of the cushioning material 64 due to the tension when the fixing member 67 of the cushioning material 64 and the pulling-in member 66 are fixed by the stopper 68. Therefore, as shown in FIG. 13, with respect to a dividing line L that divides the pulling-in member 66 into two equal parts in parallel to the skin cover 65, air holes 66c1, at least some of which are located closer to the skin cover 65 side than the dividing line L is, may be provided in the pulling-in member 66. Further, as shown in FIG. 13, with respect to a dividing line L that divides the pulling-in member 66 into two equal parts in parallel to the skin cover 65, at least an air hole 66c2 located closer to the skin cover 65 side than the dividing line L is may be provided in the pulling-in member 66. According to the above-described aspects, it is possible to blow air to the entire seat without the air holes 66c being buried in the cushioning material 64 even if tension generated by pulling the pulling-in member 66 into the cushioning material 64 is applied to the ventilation mat body. As described above, in the present invention, the part of the pulling-in member 66 that is closer to the skin cover 65 side than the dividing line L is preferably has a sufficient air permeability.

As described above, in the ventilation mat 3 according to the third embodiment, the first ventilation mat body 101 having the ventilation holes 16 and the second ventilation mat body 102 having the ventilation holes 17 constitute a single ventilation mat body. Thus, it is possible to provide a ventilation function achieved by one ventilation mat 3 for the entire backrest 61 or seating surface 62 while the pulling-in member 66 required due to a seat design is appropriately located.

Fourth Embodiment

Figure 14:
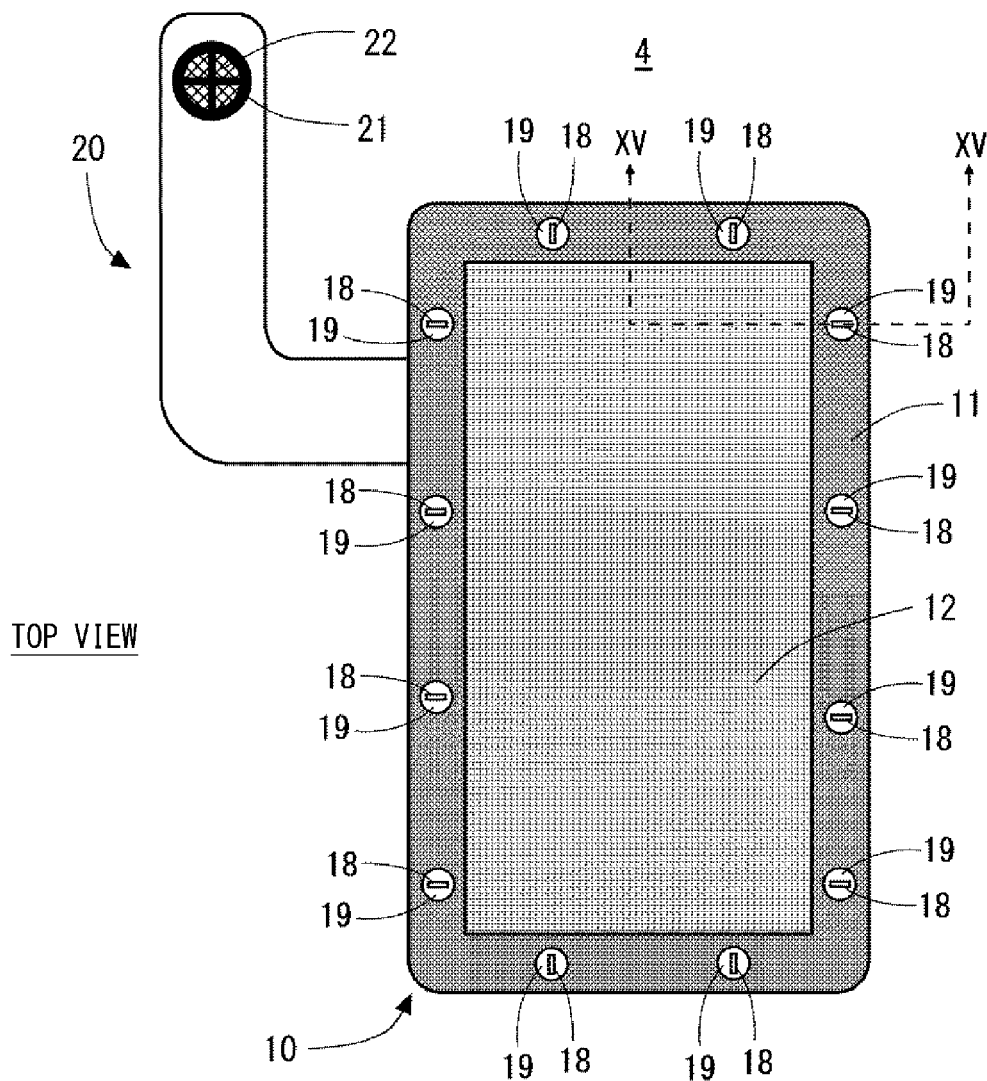
FIG. 14 is a schematic diagram of the ventilation mat according to a fourth embodiment.
Figure 15:
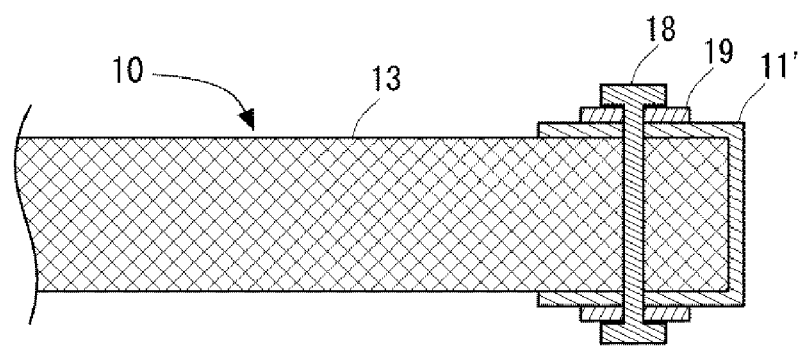
FIG. 15 is a cross-sectional view of a main part of the ventilation mat according to the fourth embodiment.

In a fourth embodiment, an example in which the side barrier is in another form will be described. FIG. 14 shows a top view of a ventilation mat 4 according to the fourth embodiment, and FIG. 15 shows an XV-XV cross-sectional view of FIG. 14. Note that in the description of the fourth embodiment, the components described in the first embodiment are denoted by the same reference symbols as those in the first embodiment, and the description thereof will be omitted.

A side barrier 11' used in the fourth embodiment is made of a film such as polyurethane resin, and is fixed to the spacer 13 by fasteners 18 arranged at intervals of 50 mm. The fastener 18 used in the fourth embodiment is commercially available as a Bano'k pin ("Bano'k" is a registered trademark No. 2450113), and is an I-shaped pin made of a resin such as nylon. This fastener 18 penetrates the spacer 13 and the side barrier 11' on both sides of the spacer 13 and physically fixes them to each other. It is obvious that the fastener 18 is not limited to such a form, and may instead be another form. Further, in order to prevent damage to the side barrier 11', a protective seal 19 may be attached to the place where the fastener 18 is located. In FIGS. 14 and 15, the protective seal is attached between the fastener 18 and the side barrier 11', but may instead be attached on the fastener 18.

When the side barrier 11 and the spacer 13 are fixed to each other by adhesion using an adhesive or a pressure sensitive adhesive, the fixation may be released due to thermal deterioration or time degradation depending on the environment in which the ventilation mat is used. However, when the side barrier 11' and the spacer 13 are fixed to each other by the fastener 18 as in the fourth embodiment, the fixation is not released due to thermal deterioration or time degradation.

Fifth Embodiment

In the fifth embodiment, an example (not shown) in which the spacer is in another form will be described. In the spacer formed by the 3D mesh sheet as described in the first embodiment, air freely flows in the two-dimensional direction. In order to meet the demand for performing the strongest ventilation at the most humid part of the seat when a person is seated, for example, it is considered that the flow of air will be controlled to some extent also in the spacer. For that purpose, a partition may be continuously formed in the spacer in the thickness direction thereof. This partition can be located, for example, by making a predetermined cut on one surface of the spacer and embedding it therein. Further, a part of the spacer may be removed to arrange a plurality of tubes connected in parallel there. Further, a 3D mesh sheet having a high yarn density only at a predetermined position may be used. When such a material is used, air passes through a part having a low yarn density, and thus the flow of air can be controlled.

When the ventilation mats 1 to 4 according to the present invention are integrated into the automobile seats 40 and 60, for example, the ventilation mat bodies 10, 101, and 102 may be fixed on the cushioning material 64 with an adhesive tape or the like. In addition to such a configuration, it is considered that, for example, when the cushioning material 64 is formed, the ventilation mat bodies 10, 101, and 102 can be located in advance in a forming mold, the material of the cushioning material will be poured therein, and then the material of the cushioning material will be foamed and hardened. In this case, the ventilation mat bodies 10, 101, and 102, and the cushioning material 64 can be securely fixed to prevent positional deviation. Such a construction method is common in the car seat heater technical field; for example, Patent Literature 2 can be referred to.

Note that the present invention is not limited to the aforementioned embodiments and may be changed as appropriate without departing from the spirit of the present invention.

This application is based upon and claims the benefit of priority from Japanese Patent Application No. 2017-108423, filed on May 31, 2017, Japanese Patent Application No. 2017-204921, filed on Oct. 24, 2017, and Japanese Patent Application No. 2017-245949, filed on Dec. 22, 2017, the disclosures of which are incorporated herein in its entirety by reference.

(Supplementary Note 1)

A seat comprising a skin cover and a seat cushioning material, the skin cover comprising a pulling-in member, the seat cushioning material comprising a fixing member, the pulling-in member and the fixing member being coupled to each other, wherein
the pulling-in member is air-permeable.

(Supplementary Note 2)

The seat described in Supplementary Note 1, wherein the pulling-in member comprises a belt-like body, and an air hole is formed in the belt-like body.

(Supplementary Note 3)

The seat described in Supplementary Note 1, wherein the pulling-in member comprises a core and a plurality of linear bodies, and the linear bodies are arranged at predetermined intervals.

(Supplementary Note 4)

The seat described in Supplementary Note 1, wherein the pulling-in member is composed of an air-permeable material.

(Supplementary Note 5)

The seat described in any one of Supplementary Notes 1 to 4, further comprising an air-blowing source and a ventilation path, wherein the ventilation path is located between the skin cover and the seat cushioning material, and divided at a position where the pulling-in member is located.

(Supplementary Note 6)

The seat described in Supplementary Note 5, wherein the ventilation path is formed into a sheet shape by integrating a plurality of tubes in parallel.

(Supplementary Note 7)

A pulling-in member configured to suspend a skin cover of a seat in a seat cushioning material of the seat, wherein the pulling-in member has an air permeability.

REFERENCE SIGNS LIST 1, 2a-2d, 3, 4 VENTILATION MAT
10 VENTILATION MAT BODY
11 SIDE BARRIER
12 AIR-PERMEABLE COVER
13 SPACER
13a NOTCHED PART
14 CONNECTING BELT
15 OPENING SURFACE 16, 17 VENTILATION HOLE
18 FASTENER
19 PROTECTIVE SEAL
20 VENTILATION GUIDE
21 FAN ATTACHMENT HOLE
22 SPACER
22a DETACHMENT PREVENTING PART
30 CONNECTION PART
40, 60 AUTOMOBILE SEAT
41, 61 BACKREST
42, 62 SEAT SURFACE
50 MASK SHEET
63 PULLING-IN PART
64 CUSHIONING MATERIAL
65 SKIN COVER
66 PULLING-IN MEMBER
66a CORE
66b BELT-LIKE BODY
66c AIR HOLE
66d LINEAR BODY
67 FIXING MEMBER
68 STOPPER
69 SPACE
101 FIRST VENTILATION MAT BODY
102 SECOND VENTILATION MAT BODY

The invention claimed is:
1. A ventilation mat comprising:
a ventilation mat body; and
a ventilation guide with a fan attachment hole provided at one end thereof, the other end of the ventilation guide being connected to a connection hole provided on a side surface of the ventilation mat body,
wherein the ventilation mat body comprises:
  a first base material having an air-permeable three-dimensional structure,
  an air-permeable cover that is formed of a cloth, is entirely air-permeable, and covers a surface of the first base material, and
  a side barrier that has an air permeability lower than that of the air-permeable cover, and covers an outer periphery of the first base material other than the connection hole;
wherein the ventilation guide is a non-air-permeable tube, and comprises a ventilation path formed inside thereof by a second base material having an air-permeable three-dimensional structure; and
wherein a plurality of mask sheets having a permeability lower than that of the air-permeable cover are attached to the air-permeable cover so that an exposed area per unit area of the air-permeable cover increases as a distance from the connection hole is longer.
2. The ventilation mat according to claim 1, wherein the air-permeable cover is a nonwoven fabric.
3. The ventilation mat according to claim 1, wherein the side barrier is fixed to the first base material by sewing or adhesion.
4. The ventilation mat according to claim 1,
wherein a detachment preventing part that projects from the ventilation guide and has a width larger than that of the ventilation guide is provided at an end of the second base material on a connection hole side; and
wherein a notched part having a shape corresponding to the shape of the detachment preventing part is provided in the vicinity of the connection hole of the first base material.
5. The ventilation mat according to claim 1,
wherein the ventilation mat body comprises a first ventilation mat body, and a second ventilation mat body that is provided distant from the first ventilation mat body;
wherein the connection hole and one or more first ventilation holes are provided in the side barrier of the first ventilation mat body; and
wherein one or more second ventilation holes corresponding to the one or more first ventilation holes are provided in the side barrier of the second ventilation mat body at a position facing the one or more first ventilation holes in an installed state of the ventilation mat.
6. The ventilation mat according to claim 1, wherein the side barrier is made of a resin film, and the side barrier and the ventilation mat body are fixed to each other by a fastener.
7. The ventilation mat according to claim 6, wherein when a distance between a pulling-in member and the one or more first ventilation holes is D1, a thickness of the first ventilation mat body is T1, a distance between the pulling-in member and the one or more second ventilation holes is D2, and a thickness of the second ventilation mat body is T2, the D1 is 0.2 to 2 times T1, and the D2 is 0.2 to 2 times T2.
8. A ventilation mat comprising:
a ventilation mat body; and
a ventilation guide with a fan attachment hole provided at one end thereof, the other end of the ventilation guide being connected to a connection hole provided on a side surface of the ventilation mat body,
wherein the ventilation mat body comprises:
  a first base material having an air-permeable three-dimensional structure,
  an air-permeable cover that is formed of a cloth, is entirely air-permeable, and covers a surface of the first base material, and
  a side barrier that has an air permeability lower than that of the air-permeable cover, and covers an outer periphery of the first base material other than the connection hole;
wherein the ventilation guide is a non-air-permeable tube, and comprises a ventilation path formed inside thereof by a second base material having an air-permeable three-dimensional structure;
wherein a detachment preventing part that projects from the ventilation guide and has a width larger than that of the ventilation guide is formed at an end of the second base material on a connection hole side;
wherein a notched part having a shape corresponding to the shape of the detachment preventing part is provided in the ventilation mat body in the vicinity of the connection hole of the first base material; and
wherein the detachment preventing part is fitted into the notched part.
9. The ventilation mat according to claim 8, wherein the air-permeable cover is a nonwoven fabric.
10. The ventilation mat according to claim 8, wherein the side barrier is fixed to the first base material by sewing or adhesion.
11. The ventilation mat according to claim 8, wherein a mask sheet having a permeability lower than that of the air-permeable cover is attached to the air-permeable cover so that an exposed area per unit area of the air-permeable cover increases as a distance from the connection hole is longer.
12. The ventilation mat according to claim 8,
wherein the ventilation mat body comprises a first ventilation mat body, and a second ventilation mat body that is provided distant from the first ventilation mat body;

wherein the connection hole and one or more first ventilation holes are provided in the side barrier of the first ventilation mat body; and wherein one or more second ventilation holes corresponding to the one or more first ventilation holes are provided in the side barrier of the second ventilation mat body at a position facing the one or more first ventilation holes in an installed state of the ventilation mat.

13. The ventilation mat according to claim 8, wherein the side barrier is made of a resin film, and the side barrier and the ventilation mat body are fixed to each other by a fastener.

14. The ventilation mat according to claim 12, wherein when a distance between a pulling-in member and the one or more first ventilation holes is D1, a thickness of the first ventilation mat body is T1, a distance between the pulling-in member and the one or more second ventilation holes is D2, and a thickness of the second ventilation mat body is T2, the D1 is 0.2 to 2 times T1, and the D2 is 0.2 to 2 times T2.

15. A ventilation mat installed in a seat comprising:
    a ventilation mat body; and
    a ventilation guide with a fan attachment hole provided at one end thereof, the other end of the ventilation guide being connected to a connection hole provided on a side surface of the ventilation mat body,
    wherein the ventilation mat body comprises:
        a first base material having an air-permeable three-dimensional structure,
        an air-permeable cover that is formed of a cloth, is entirely air-permeable, and covers a surface of the first base material, and
        a side barrier that has an air permeability lower than that of the air-permeable cover, and covers an outer periphery of the first base material other than the connection hole;
    wherein the ventilation guide is a non-air-permeable tube, and comprises a ventilation path formed inside thereof by a second base material having an air-permeable three-dimensional structure;

wherein the ventilation mat body is divided into a first ventilation mat body, and a second ventilation mat body that is provided distant from the first ventilation mat body;

wherein the connection hole and one or more first ventilation holes are provided in a side barrier of the first ventilation mat body; and wherein one or more second ventilation holes corresponding to the one or more first ventilation holes are provided in a side barrier of the second ventilation mat body at a position facing the one or more first ventilation holes.

16. The ventilation mat according to claim 15, wherein when a distance between a pulling-in member and the one or more first ventilation holes is D1, a thickness of the first ventilation mat body is T1, a distance between the pulling-in member and the one or more second ventilation holes is D2, and a thickness of the second ventilation mat body is T2, the D1 is 0.2 to 2 times T1, and the D2 is 0.2 to 2 times T2.

17. The ventilation mat according to claim 15, wherein the air-permeable cover is a nonwoven fabric.

18. The ventilation mat according to claim 15, wherein
    a detachment preventing part that projects from the ventilation guide and has a width larger than that of the ventilation guide is provided at an end of the second base material on a connection hole side, and
    a notched part having a shape corresponding to the shape of the detachment preventing part is provided in the vicinity of the connection hole of the first base material.

19. The ventilation mat according to claim 15, wherein a mask sheet having a permeability lower than that of the air-permeable cover is attached to the air-permeable cover so that an exposed area per unit area of the air-permeable cover increases as a distance from the connection hole is longer.

20. The ventilation mat according to claim 15, wherein the side barrier is made of a resin film, and the side barrier and the ventilation mat body are fixed to each other by a fastener.

* * * * *